(12) United States Patent
Dada

(10) Patent No.: US 11,206,280 B2
(45) Date of Patent: Dec. 21, 2021

(54) CYBER SECURITY THREAT MANAGEMENT (71) Applicant: Olawale Oluwadamilere Omotayo Dada, London (GB)

(72) Inventor: Olawale Oluwadamilere Omotayo Dada, London (GB)

(*) Notice: Subject to any disclaimer, the term of this patent is extended or adjusted under 35 U.S.C. 154(b) by 101 days.

(21) Appl. No.: 16/672,531

(22) Filed: Nov. 4, 2019

(65) Prior Publication Data
US 2020/0067965 A1 Feb. 27, 2020

(51) Int. Cl.
| H04L 29/06 | (2006.01) |
| G06N 5/04 | (2006.01) |
| G06Q 10/06 | (2012.01) |
| H04L 29/08 | (2006.01) |
| G06F 16/951 | (2019.01) |
| G06Q 20/10 | (2012.01) |

(52) U.S. Cl.
CPC ........ H04L 63/1433 (2013.01); G06F 16/951 (2019.01); G06N 5/04 (2013.01); G06Q 10/06311 (2013.01); H04L 63/20 (2013.01); H04L 67/36 (2013.01); G06Q 20/10 (2013.01)

(58) Field of Classification Search
None
See application file for complete search history.

(56) References Cited

U.S. PATENT DOCUMENTS

| 2006/0004614 | A1* | 1/2006 | Hutchinson | G06Q 10/10 |
| | | | | 705/7.27 |
| 2007/0169199 | A1* | 7/2007 | Quinnell | G06F 21/577 |
| | | | | 726/25 |
| 2011/0288692 | A1* | 11/2011 | Scott | H04L 63/20 |
| | | | | 700/297 |
| 2014/0283083 | A1* | 9/2014 | Gula | H04L 63/1433 |
| | | | | 726/25 |
| 2015/0172307 | A1* | 6/2015 | Borohovski | H04L 63/1408 |
| | | | | 726/25 |
| 2016/0119365 | A1* | 4/2016 | Barel | G06F 16/84 |
| | | | | 726/12 |
| 2018/0091537 | A1* | 3/2018 | Uggirala | G06F 16/9566 |
| 2018/0176206 | A1* | 6/2018 | Matthews | H04L 63/083 |
| 2018/0204111 | A1* | 7/2018 | Zadeh | G06K 9/3233 |
| 2018/0288073 | A1* | 10/2018 | Hopper | G06Q 20/4016 |
| 2019/0007440 | A1* | 1/2019 | Lavi | G06Q 50/26 |
| 2019/0172026 | A1* | 6/2019 | Vessenes | H04L 9/3247 |
| 2020/0117807 | A1* | 4/2020 | Nadgowda | G06F 8/65 |
| 2020/0374316 | A1* | 11/2020 | Crabtree | H04L 63/1441 |
| 2020/0394309 | A1* | 12/2020 | Angelo | G06F 16/22 |

* cited by examiner

Primary Examiner — Kaveh Abrishamkar (57) ABSTRACT

Embodiments of the present invention provides a system to create a decentralized, scalable, blockchain powered cyber security management solution to monitor, protect themselves against and eliminate cyber threats, thereby managing cyber security. The cyber security management solution places an emphasis upon the strength of the wider community to contribute to finding vulnerabilities through a blockchain based mechanism. The cyber security management platform (such as Uncloak platform) may harness knowledge and expertise, aggregate it into the platform, and transform it into a service for end users. If the end user clients can understand their security risk position in realtime, they can place themselves in a strong position to eliminate cyber threats before they occur.

12 Claims, 4 Drawing Sheets

CYBER SECURITY THREAT MANAGEMENT

FIELD OF THE INVENTION

The present application generally relates to cyber security, and particularly to systems and methods for managing cyber security threats. More particularly, the present invention discloses a unique and fully scalable blockchain and Artificial Intelligence (AI) powered technologies that enable businesses to monitor, protect themselves against and eliminate cyber threats, staying one step ahead of hackers.

BACKGROUND

Computer hacking is identifying weaknesses in computer systems or networks to exploit its weaknesses to gain access. Now-a-days, computers have become mandatory to run successful businesses. It is not enough to have isolated computers systems. In fact, they need to be networked to facilitate communication with external businesses. This exposes them to the outside world and hacking. Computer hacking means using computers to commit fraudulent acts such as fraud, privacy invasion, stealing corporate or personal data, and so on. Computer hacking is one of the world's major problems with new breaches of data and releases of ransomware occurring at an alarming rate. Cyber-crimes cost many organizations millions of dollars every year. For example, with the recent trends, cyber-crimes are predicted to cost $6 trillion annually by 2021. There are no boundaries: from some of the world's largest corporations, to critical national infrastructure, to small local enterprises and individuals. They have been hacked in the past and trends suggest this will continue, particularly as evolving programs such as Internet of Things (IoT), smart cities, and mass digitization become the reality of life.

Cyber security attacks are more frequent than ever before, partly due to the availability of internet connectivity across all types of devices from laptops, desktops, notepads, and mobile phones affecting not just businesses but individuals as well. Crypto currencies, crypto exchanges, and tokens issuance platforms have also suffered from significant security breaches over the last few years further compounding the issue.

The public sector, internet, and telecommunications sectors are highly susceptible to espionage focused cyber-attacks. Businesses need to be aware of the full costs of a cyber-attack, in particular, the "slow-burn" costs i.e., those associated with the long-term impacts of a cyber-attack, such as the loss of competitive advantage and customer churn. When added to immediate costs i.e., legal and forensic investigation fees, and extortion pay outs, slow burn costs can dramatically increase the final bill.

Security breaches can cause serious financial and reputational damage. There is no standard model for estimating incident cost, the only data available is that made public by organizations involved. Computer security consulting firms have produced estimates of total worldwide losses: from $13 billion (worms and viruses only) to $226 billion (for all forms of covert attacks) annually. This has forced companies to diversify products, moving from "detect only" to "detect and respond", tracking data leaks, hacks, other intrusions and preventing further repercussions from stolen data. For businesses, this mean stopping access to accounts and services subject to data loss or infiltration, tracking source of intrusion, and shoring up cyber defenses. Unfortunately, most companies are highly exposed to cyber threats due to the constantly changing nature of cyber-attacks which require security expertise and financial resource to remain secure.

Currently, there is a shortage of cyber security solutions that are proactive in identifying new threats and allowing end users to shut them out or close them down. While some capabilities exist at a Governmental level, the present invention discloses a tool that will close this gap and maintain significant revenues across many sectors that are susceptible to cyber-crimes.

Tackling cyber security threats requires more than anti-virus protection, firewalls, and intrusion detection systems. Currently, cyber security solutions rely on an isolated and custom-made approach to cyber threat management with limited knowledge sharing between competitive security vendors. Most of the patterns and signatures that aid cyber security software in detecting a security vulnerability are freely available on the public internet, thus allowing the hacker to have the same knowledge as a security vendor. The result is an endless game of cat and mouse, with a cyclical race to stay one step ahead, until the next breach is surfaced. The status-quo puts the advantage with the hacker.

In the light of above-mentioned background, there exists a need for a solution that solves the abovementioned problems and provides a seamless mechanism for managing cyber security threats including monitoring, protecting themselves against and eliminating cyber threats, thereby staying one step ahead of hackers. In order to solve the abovementioned problems and provides the seamless mechanism, the present invention discloses a cyber security threat management system including a unique and fully scalable blockchain and Artificial Intelligence (AI) technologies based analytical tool for intuitive, automated, and seamless performance of security checks, thereby giving users the ability to cut through the cyber jargon and understand, remediate, and resolve cyber security issues. In the absence of innovation tools of the present invention as described below in detail, successfully evaluating a company's computers and network infrastructure requires specialized, highly skilled labor, extensive setup time and significant costs. The present invention, by virtue of its implementation, seeks to make this level of cyber security available on a mass scale, at a lower cost and with simple end user interaction.

SUMMARY

It will be understood that this disclosure in not limited to the systems and methodologies described herein, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

It is an objective of the present invention to create a decentralized, scalable, blockchain powered cyber security management solution to monitor, protect themselves against and eliminate cyber threats, thereby managing cyber security. The cyber security management solution places an emphasis upon the strength of the wider community to contribute to finding vulnerabilities through a blockchain based mechanism. The cyber security management platform (such as Uncloak platform) may harness knowledge and expertise, aggregate it into the platform, and transform it into a service for end users. If the end user clients can understand their security risk position in real-time, they can place themselves in a strong position to eliminate cyber threats before they occur.

It is another objective of the present invention to provide an Artificial Intelligence (AI) based analytical tool for the intuitive, automated and seamless performance of security checks, thereby giving users an ability to cut through the cyber jargon and understand, remediate, and resolve cyber security issues.

It is another objective of the present invention to build a threat detection database by using advanced AI technology. The advanced AI technology may be used to crawl the public and private internet searching for the latest cyber security threats, which are converted into security signatures and added to the Uncloak threat detection system to check if vulnerabilities exist across the subscribed client base networks and infrastructure. In a scenario where the vulnerabilities may exist, the end user is notified immediately so that corrective action may be taken. In an embodiment, the Uncloak threat detection system engages an active community of cyber security experts (such as ethical and non-ethical hackers) to find undiscovered security threats. The Uncloak threat detection system also constantly updates itself using AI technology to scan the internet looking for upcoming security vulnerabilities to add to its threat vulnerability database.

In an embodiment, the Uncloak threat detection system facilitates automatically identifying a client's public internet footprint covering websites, email servers, applications, and computers on the internet in readiness for a security scan greatly reducing the timescales around security scanning setup. The Uncloak threat detection system further facilitates easy to understand dashboard to check progress of scans and reports, request external IT consultancy, and set up schedule scanning jobs. The Uncloak threat detection system further facilitates executing a black hat test. The black hat test would simulate what an actual hacker would do to gain access to a corporate computer system. For example, the Uncloak threat detection system may simulate a live hack attempt against an email server and check the client's antivirus protection.

In an embodiment, the Uncloak threat detection system further facilitates using several smart contracts. A smart contract is a function allowing a set of predetermined actions to be performed in a secure manner. For example, a smart contract may allow tokens to be issued to a hacker on the basis that a new cyber threat vulnerability has been found and checked by other hackers in the same community. Using a token (called as UCC token) on a cyber security platform (such as Uncloak platform), a smart contract may be used to create a voting rights system that allows a community of registered IT security experts or software developers (known as 'hunters') to collaborate on finding cyber threats or security issues within one or more applications and network devices of an organization, while also finding a remediation needed to resolve the cyber threat issues. In an embodiment, any vulnerabilities that have been found within an application by a hunter (i.e., an ethical or non-ethical hacker) are immediately checked against the existing threat detection database. The check is performed to ensure that it is indeed a new cyber threat and not an existing recorded threat. Each hunter has ability to check another hunter's vulnerability, taking one or more validators (i.e., ethical or non-ethical hackers) to check if the vulnerability found is genuine and may be recorded to the blockchain as a real cyber threat. In an embodiment, the hunter discovering the vulnerability (i.e., the new cyber threat) may be rewarded with one or more tokens (for example, may be given 10,000 UCC tokens) unique to the platform, whilst the hunters (i.e., the one or more validators) who have checked the validity of the vulnerability may be rewarded with one or more tokens (for example, may be given 1500 UCC tokens each). The one or more tokens may be converted on the Uncloak platform to tradeable UNC tokens which can be exchanged for other digital currency such as Ethereum on a public exchange.

In an embodiment, the use of the blockchain and smart contract voting rights system greatly reduces the level of manual administration, costs, and time required to advertise a new cyber threat via the Uncloak platform. All subscribers to the Uncloak platform may receive the latest list of cyber threat vulnerabilities against their existing computing infrastructure, allowing them to identify where the potential threats lie and can then take the necessary remediation steps.

These and other features and advantages of the present invention will become apparent from the detailed description below, in light of the accompanying drawings.

BRIEF DESCRIPTION OF ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which.

Further areas of applicability of the present invention will become apparent from the detailed description provided hereinafter. It should be further understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such a design from the specification.

Before describing the present invention in detail, it should be observed that the present invention utilizes a combination of components, which constitutes a decentralized, scalable, blockchain, and Artificial Intelligence (AI) powered cyber security management systems to monitor, protect themselves against, and eliminate cyber threats, thereby managing cyber security. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, systems and methods for managing cyber security. More particularly, the present invention discloses a unique and fully scalable blockchain and Artificial Intelligence (AI) powered technologies that enable businesses to monitor, protect themselves against and eliminate cyber threats, staying one step ahead of hackers. The use of the blockchain and AI powered technologies and smart contract voting rights system greatly reduces the level of manual administration, costs and time required to advertise a new cyber threat via the Uncloak platform. All subscribers to the Uncloak platform may receive the latest list of cyber threat vulnerabilities against their existing computing infrastructure, allowing them to identify where the potential threats lie and can then take the necessary remediation steps.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems and methods have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

Various methods and systems of the present invention will now be described with reference to the accompanying drawings, which should be regarded as merely illustrative without restricting the scope and ambit of the present invention. The present invention provides systems and methods for managing cyber security. Embodiments of the present invention will now be described with reference to FIGS. 1-4.

Figure 1:
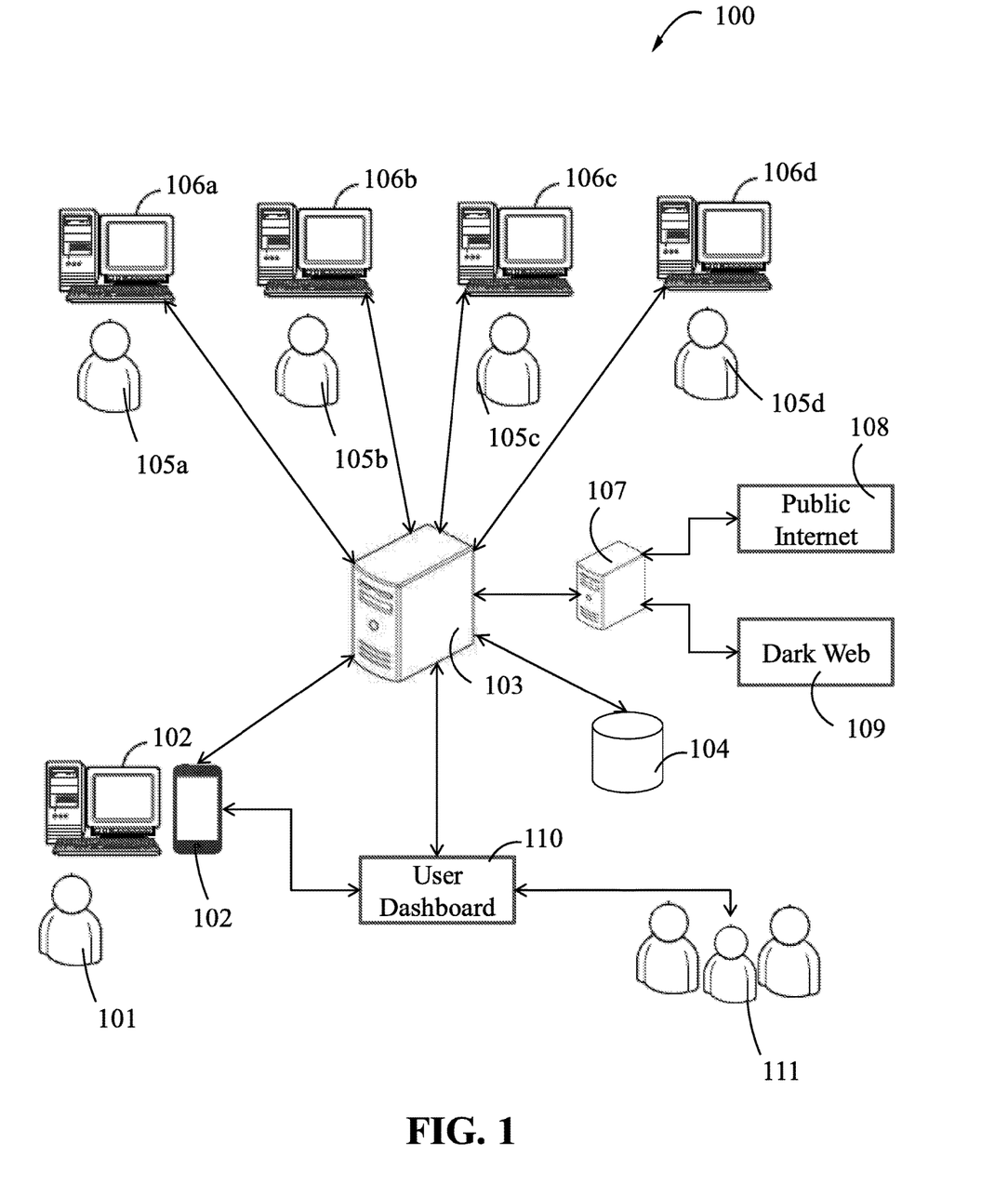
FIG. 1 is a diagram that illustrates a system environment for managing cyber security threats, according to an exemplary embodiment of the present invention.

FIG. 1 is a diagram that illustrates a system environment 100 for managing cyber security threats, according to an exemplary embodiment of the present invention. The system environment 100 includes a customer 101, a computing infrastructure 102 associated with the customer 101, and an Uncloak platform 103 with one or more databases 104 for information storage. The system environment 100 includes a community of registered IT security experts or software developers (known as 'hunters') such as a first hunter 105a, a second hunter 105b, a third hunter 105c, and a fourth hunter 105d. Each hunter is associated with a computing device, for example, the first hunter 105a is associated with a first computing device 106a, the second hunter 105b is associated with a second computing device 106b, the third hunter 105c is associated with a third computing device 106c, and the fourth hunter 105d is associated with a fourth computing device 106d. The system environment 100 further includes an AI threat detection engine 107 that is communicatively connected to a public internet 108 and a dark web 109. The system environment 100 further includes a user dashboard 110 and channel partners 111. Various electronic infrastructure (such as the computing infrastructure 102, the Uncloak platform 103, the database 104, the first computing device 106a, the second computing device 106b, the third computing device 106c, the fourth computing device 106d, the AI threat detection engine 107, the user dashboard 110, and so on) of the system environment 100 may communicate with each other over one or more communication networks. Examples of types of a communication network include, but are not limited to, a local area network, a wide area network, a radio network, a virtual private network, an internet area network, a metropolitan area network, a satellite network, a Wi-Fi network, Bluetooth Low energy, a wireless network, and a telecommunication network. Examples of the telecommunication network include, but are not be limited to, a global system for mobile communication (GSM) network, a general packet radio service (GPRS) network, third Generation Partnership Project (3GPP), 4G, 5G, Long-Term Evolution (LTE), an enhanced data GSM environment (EDGE) and a Universal Mobile Telecommunications System (UMTS).

In an embodiment, the customer 101 may be an individual associated with an entity such as a company or a business that is engaged in providing one or more products or services to other customers. For example, the customer 101 may be associated with the entity who are involved with Business-to-business (B2B), Business-to-Consumer (B2C), Business-to-government (B2G), Consumer-to-consumer (C2C), Government to consumer (G2C), or Government-to-business (G2B). Various services in a diversity of industrial fields may include financial services such as a wire transfer or stock trading by accessing servers operated by banks or securities firms, civil services such as issuing copies of resident registration and other various certificates by accessing servers operated by governmental bodies, and e-commerce services for purchasing goods by accessing servers for selling goods. In an embodiment, the customer 101 may be associated with the computing infrastructure 102. The computing infrastructure 102 may include one or more electronic devices that can be used to communicate with other devices or servers over the one or more communication networks. Examples of the computing infrastructure 102 include, but are not limited to, a cell phone, a smart phone, a cellular phone, a cellular mobile phone, a personal digital assistant (PDA), a navigation terminal, a personal computer, a laptop, a tablet computer, or a network of computers. The customer 101 may utilize the computing infrastructure 102 to perform one or more tasks associated with the company or business. In some embodiments, the computing infrastructure 102 may be configured to automatically perform the one or more tasks by executing and processing suitable logic, circuitry, interfaces, instructions, and/or code. The computing infrastructure 102 may be communicatively connected over the private or public Internet.

In an embodiment, the Uncloak platform 103 may be an application server and may include suitable logic, circuitry, interfaces, and/or code, executable by the circuitry, that may be configured to perform one or more operations. The Uncloak platform 103 may be a computing device or application, which may include a software framework, that may be configured to create the server implementation and perform the various operations. The Uncloak platform 103 may be realized through various web-based technologies, such as, but are not limited to, a Java web-framework, a .NET framework, a professional hypertext preprocessor (PHP) framework, a python framework, or any other web-application framework. The Uncloak platform 103 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. The Uncloak platform 103 may also be realized and implemented using blockchain and AI based technologies. Examples of the Uncloak platform 103 may include, but are not limited to, a personal computer, a laptop, or a network of computer systems.

In an embodiment, the present invention, by way of at least one of the Uncloak platform 103, the database 104, one or more hunter computing devices 106a-106d, and the AI threat detection engine 107 describes technologies for creating a decentralized, scalable, blockchain powered cyber security management solution to monitor, protect themselves against and eliminate cyber threats, thereby managing cyber security. The cyber security management solution places an emphasis upon the strength of the wider community to contribute to finding vulnerabilities through a blockchain based mechanism. The Uncloak platform 103 may harness knowledge and expertise, aggregate it into the platform, and transform it into a service for end users. If the end user clients can understand their security risk position in real-time, they can place themselves in a strong position to eliminate cyber threats before they occur. These Uncloak platform 103 generally involve managing cyber security threat or vulnerabilities based on a blockchain network and/or AI powered technologies. In some embodiments, parties involved in a security vulnerability management of a service providing platform, such as one or more of a service provider, a service user, an administrator or regulator, or a hunter (i.e., a security specialist) can be integrated by a blockchain network. Each of these parties can be a participant (such as the first hunter 105a, the second hunter 105b, the third hunter 105c, or the fourth hunter 105d), a client (such as the customer 101), or a channel partner 111 of the blockchain network. Each party can process information related to the cyber security vulnerabilities by interacting with the blockchain network, for example, via a smart contract. The Uncloak platform 103 may provide defined interfaces and easy access to the parties and provide enhanced data security of the service providing platform. As described herein, a cyber security threat or vulnerability may be a weakness (in software, hardware, and/or network) that can be exploited by a cyber-attacker to perform unauthorized actions within a computer system or network. In some embodiments, a security specialist, such as an ethical or non-ethical computer hacker (also known as "hunter") can perform tests on one or more computer systems and networks to assess computer security and identify cyber security vulnerabilities. Resolutions (e.g., a software patch, an upgraded firewall, etc.) can be provided to remedy the identified cyber security vulnerabilities, so as to improve security by exposing vulnerabilities before malicious hackers can detect and exploit them. In an embodiment, the Uncloak platform 103 engages an active community of cyber security experts (such as the ethical and non-ethical hackers) to find undiscovered security threats. The Uncloak platform 103 also constantly updates itself using AI technology to scan the internet looking for upcoming security vulnerabilities to add to its threat vulnerability database such as the database 104. In an embodiment, the Uncloak platform 103 further facilitates automatically identifying the client's public internet footprint covering websites, email servers, applications, and computers on the internet in readiness for a security scan greatly reducing the timescales around security scanning setup. The Uncloak platform 103 further facilitates easy to understand dashboard (such as the dashboard 110) to check progress of scans and reports, request external IT consultancy (such as by the channel partners 111), and set up schedule scanning jobs. When the client (such as the customer 101) requests for resolving their existing issues related to the cyber security threats, KYC (Know Your Customer) may be performed by the channel partners 111 who wish to aid end users on fixing their issues. The KYC may be performed by verifying requisite documents such as identity documents, address documents, educational documents, professional documents, or the like. Based on the successful KYC, one or more channel partners 111 may be allocated to the client for resolving their existing issues. Further, in an embodiment, the channel partners 111 may utilize the smart contract to provide support for the end users such as the customer 101. Further, the Uncloak platform 103 may utilize escrow to make payment to the channel partners 111 or associated engineers once the issues of the client are resolved. Escrow is a financial arrangement where a third party or the Uncloak platform 103 holds and regulates payment of the funds (such as UCC tokens) required for two parties involved in a given transaction upon successful completion of the assigned task. It helps make transactions more secure by keeping the payment in a secure escrow account which is only released when all of the terms of an agreement are met as overseen by the escrow company or the Uncloak platform 103.

In an embodiment, the Uncloak platform 103 further facilitates using several smart contracts. In an embodiment, the use of the blockchain and smart contract voting rights system greatly reduces the level of manual administration, costs, and time required to advertise a new cyber threat via the Uncloak platform 103. All subscribers to the Uncloak platform 103 may receive the latest list of cyber threat vulnerabilities against their existing computing infrastructure, allowing them to identify where the potential threats lie and can then take the necessary remediation steps.

In an embodiment, the database 104 may include suitable logic, circuitry, interfaces, and/or code, executable by the circuitry that may be configured to perform one or more operations, such as receiving, storing, processing, and transmitting queries, data, or content. The database 104 may be a data management and storage computing device that is communicatively coupled to the Uncloak platform 103 via the one or more communication networks to perform the one or more operations. In an exemplary embodiment, the database 104 may be configured to manage and store various types of cyber security threats and their remedies, and thus the database 104 may be, hereinafter, referred to as the threat detection database 104 without limiting the scope of the present invention. The threat detection database 104 may be configured to use the AI technology (such as the AI threat detection engine 107) to crawl the public and private Internet looking for the latest cyber security threats, which are converted into security signatures and added to the Uncloak threat detection system to check if one or more vulnerabilities (i.e., cyber security threats) exist across the subscribed client base networks and infrastructure (such as the computing infrastructure 102). In some embodiment, the Uncloak platform 103 may build the threat detection database 104. In an embodiment, the database 104 may be configured to receive one or more queries from the Uncloak platform 103 or various hunter computing devices 106a-106d. Each query may correspond to an encrypted message that is decoded by the database 104 to determine a request for retrieving requisite information requested by the Uncloak platform 103 or various hunter computing devices 106a-106d. In response to each received query, the database 104 may be configured to retrieve and communicate the requested information to the Uncloak platform 103 or various hunter computing devices 106a-106d. Examples of the database 104 may include, but are not limited to, a personal computer, a laptop, or a network of computer systems.

In an embodiment, the hunter (such as the first hunter 105a, the second hunter 105b, the third hunter 105c, or the fourth hunter 105d) may be a registered IT security experts or a software developer who is involved in finding cyber threats or security issues within one or more applications or network devices of an organization, while also finding one or more remediations or resolutions needed to resolve the cyber threat issues. Each hunter may utilize a respective computing device to detect or identify the cyber threats or security issues within the one or more applications or network devices of the organization. In an embodiment, the one or more vulnerabilities that may have been detected within an application or a network by the hunter (such as the first hunter 105a) are immediately checked against an existing public cyber vulnerability database such as the threat detection database 104. The check is performed to determine whether the detected vulnerability is a new cyber threat or an existing cyber threat. Further, in an embodiment, each hunter has ability to check another hunter's vulnerability, taking one or more validators to check if the detected vulnerability is genuine and may be recorded to the blockchain as a real cyber threat. For example, other hunters (such as the second hunter 105b, the third hunter 105c, and/or the fourth hunter 105d) may validate the one or more vulnerabilities detected by the first hunter 105a. In a scenario where the one or more detected vulnerabilities are determined as new security threats, then the first hunter 105a may be rewarded with one or more tokens (for example, may be given 10,000 UCC tokens) that are unique to the platform, while the other hunters (i.e., the one or more validators) who have checked the validity of the one or more vulnerabilities may be rewarded with one or more tokens (for example, may be given 1500 UCC tokens each). In an exemplary embodiment, the UCC tokens awarded to the first hunter 105a may be greater than the UCC tokens that are awarded to the other hunters who have validated the one or more vulnerabilities detected by the first hunter 105a. The one or more awarded tokens may be converted on the Uncloak platform 103 to tradeable UNC tokens which can be exchanged for other digital currency such as Ethereum on a public exchange.

The AI threat detection engine 107 may include suitable logic, circuitry, interfaces, and/or code, executable by the circuitry, that may be configured to perform one or more operations. The AI threat detection engine 107 may be configured to crawl the public and private internet 108 and the dark web 109 searching for the latest cyber security threats, which are converted into security signatures and added to the Uncloak threat detection system to check if vulnerabilities exist across the subscribed client base networks and infrastructure.

The user dashboard 110 may include suitable logic, circuitry, interfaces, and/or code, executable by the circuitry, that may be configured to perform one or more operations. The Uncloak platform 103 may present one or more user interfaces on the user dashboard 110. The Uncloak platform 103 may present these easy to understand dashboard to check progress of scans and reports, request external IT consultancy, and set up schedule scanning jobs. Further, the Uncloak platform 103 may allow users to scan their internal network for threats and vulnerabilities and report back to the central user dashboard 110.

Figure 2:
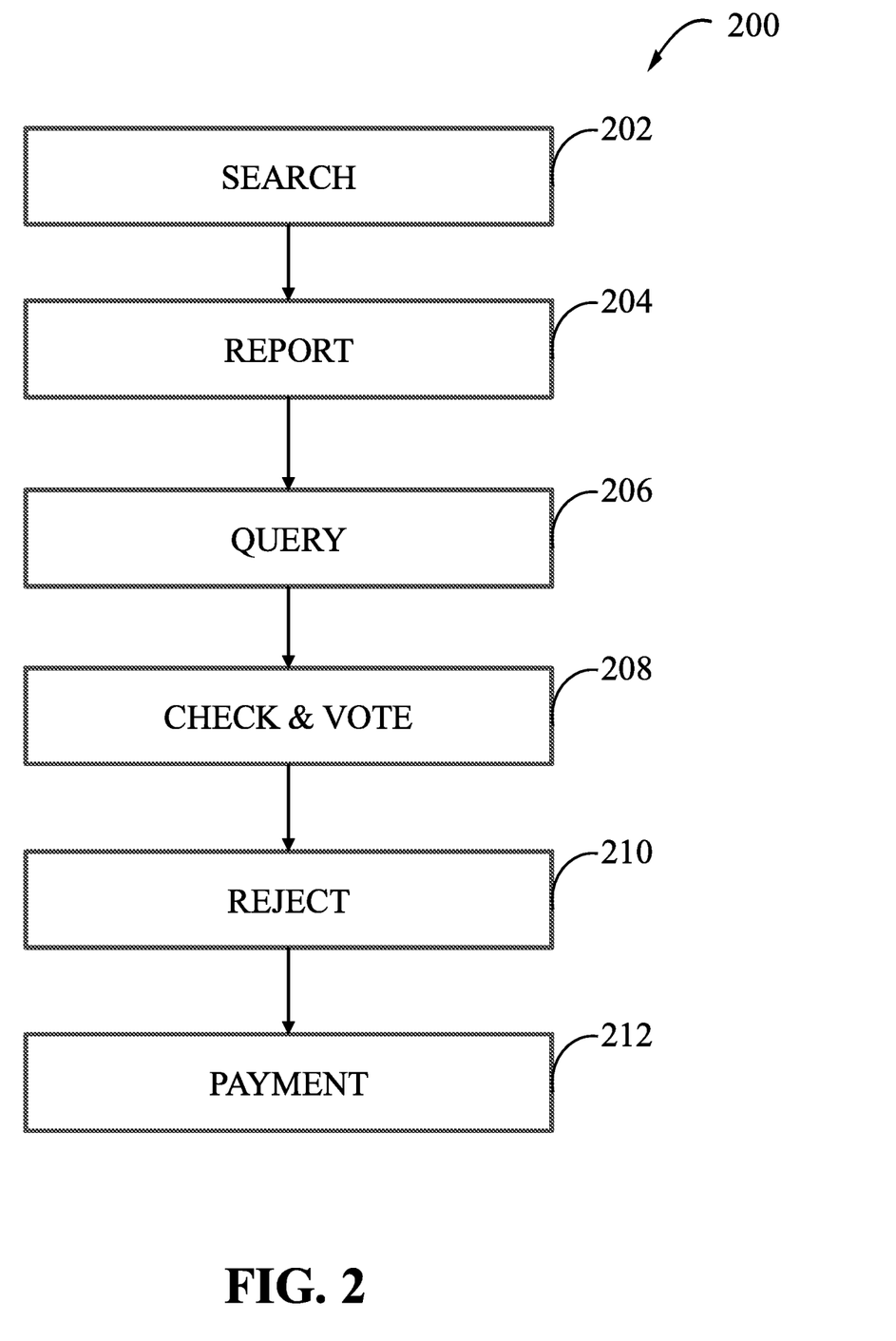
FIG. 2 is a diagram that illustrates a method for managing cyber security threats, according to an exemplary embodiment of the present invention.

FIG. 2 is a diagram 200 that illustrates a method for managing cyber security threats, according to an exemplary embodiment of the present invention. At step 202, the Uncloak platform 103 may search or scan the client's computer infrastructure 102. The client's computer infrastructure 102 may be searched or scanned to look out for the vulnerabilities or threats. At step 204, the Uncloak platform 103 may report the found vulnerabilities or threats to the client such as the customer 101. At step 206, the Uncloak platform 103 may query the one or more hunters (such as the hunters 105a-105d) to check for the vulnerabilities or threats. The one or more hunters of the community of hunters are allowed to perform cyber security threat hunting onto the Uncloak platform 103 after their successful registration onto the platform. The registration is successfully performed by the Uncloak platform 103 by successfully executing and validating at least an application of each hunter. The hunters are given an anonymized list of software or hardware to check for the vulnerabilities or threats. In a specific example, the first hunter 105a may analyze the anonymized list of software or hardware to check for the vulnerabilities or threats. At step 208, the hunters find the vulnerabilities or threats. The found vulnerabilities or threats are checked against the threat detection database 104. The Uncloak platform 103 may perform the check by searching the threat detection database 104 for a presence or absence of the detected vulnerabilities or threats. The check is performed to ensure that it is indeed a new cyber threat and not an existing recorded threat. If it is determined that the detected vulnerabilities or threats do not exist in the threat detection database 104, then the Uncloak platform 103 may execute a voting right system to validate the detected vulnerabilities or threats. At step 210, a random set of validators (such as the hunters 105b-105d) check the hunters (such as the first hunter 105a) and the detected vulnerabilities or threats. Based on the check, the validators either accept or decline the detected vulnerabilities or threats based on the voting right mechanism in the blockchain. At step 212, a payment is made to the first hunter 105a and the validators 105b-105d. If the detected vulnerabilities or threats are accepted, then the first hunter 105a and the validators 105b-105d are rewarded with one or more tokens such as UCC tokens and are added to a respective personal wallet on the blockchain.

Thus, the hacker such as the first hunter 105a who has detected the vulnerabilities or threats and the validators (such as the second hunter 105b, the third hunter 105c, and the fourth hunter 105d) are rewarded with one or more tokens such as UCC tokens. In an exemplary embodiment, the first hunter 105a may be given 10,000 UCC tokens and the validators may be given 1,000 UCC tokens each. The one or more tokens may be converted on the Uncloak platform 103 to tradeable UNC tokens which can be exchanged for other digital currency such as Ethereum on a public exchange. In an exemplary embodiment, the UCC tokens awarded to the first hunter 105a may be greater than the UCC tokens that are awarded to the validators.

The various actions, acts, blocks, steps, or the like in the diagram 200 may be performed in the order presented, in a different order, or simultaneously. Further, in some embodiments, some of the actions, acts, blocks, steps, or the like may be omitted, added, modified, skipped, or the like without departing from the scope of the present invention.

Currently, the Uncloak platform 103 facilitates automatically identifying a client's public internet footprint covering websites, email servers, applications, and computers on the internet in readiness for a security scan greatly reducing the timescales around security scanning setup. The Uncloak platform 103 further facilitates easy to understand dashboard to check progress of scans and reports, request external IT consultancy, and set up schedule scanning jobs. The Uncloak platform 103 further facilitates executing a black hat test. The black hat test would simulate what an actual hacker would do to gain access to a corporate computer system. For example, the Uncloak platform 103 may simulate a live hack attempt against an email server and check the client's antivirus protection. The Uncloak platform 103 is seeking to meet market requirements through the innovative use of the blockchain and AI to ensure it becomes a cyber-security market leader giving companies the best opportunity to proactively secure their computing infrastructure. Some of the features will include the following:

On Premise Software Tool
Allow users to scan their internal network for threats and vulnerabilities and report back to the central dashboard such as the user dashboard 110.
Advanced Network Discovery Tool
Cloud environments can be scanned with ability to look for vulnerabilities across public/private/hybrid cloud environments ranging from Microsoft™, AWS™ and Google™.
Intelligent Security Compliance Tool
Innovative engine to check against cyber essentials/PCI DSS/ISO27001 compliance requirements.
Black Hat Extreme Mode
Conversion of online security database into a number of additional tools that can check for vulnerabilities with multiple operating systems issues ranging from the website, workstation, and databases.

The Uncloak platform 103 supports various business goals. For example, vulnerabilities are not allowed to be added to the platform without approval from a pool of verified hunters (such as two or more validators) chosen at random. End to end visibility of vulnerabilities found and payments to the hunters and validators within the Uncloak platform 103 occur automatically without intervention. Real-time analytics and automated reporting with a locked audit trail of everything. Tamper-proof vulnerability database such as the threat detection database 104. Securely sharing data with all parties. Reduce reporting process time and effort for vulnerability checks. Leaderboard system for all registered hunters/validators with bonus stars given to the most frequent contributors resulting higher in token payouts.

In an embodiment, the Uncloak platform 103 allows companies or clients to purchase ethical hacking testing for their own applications from the pool of verified hunters who have proven to be competent in validating and finding vulnerabilities via a scoring mechanism. Companies or clients may purchase UNC tokens directly on the platform backed by a smart contract which will give them a finite amount of time for the hunters to work on the application to be tested.

Figure 3:
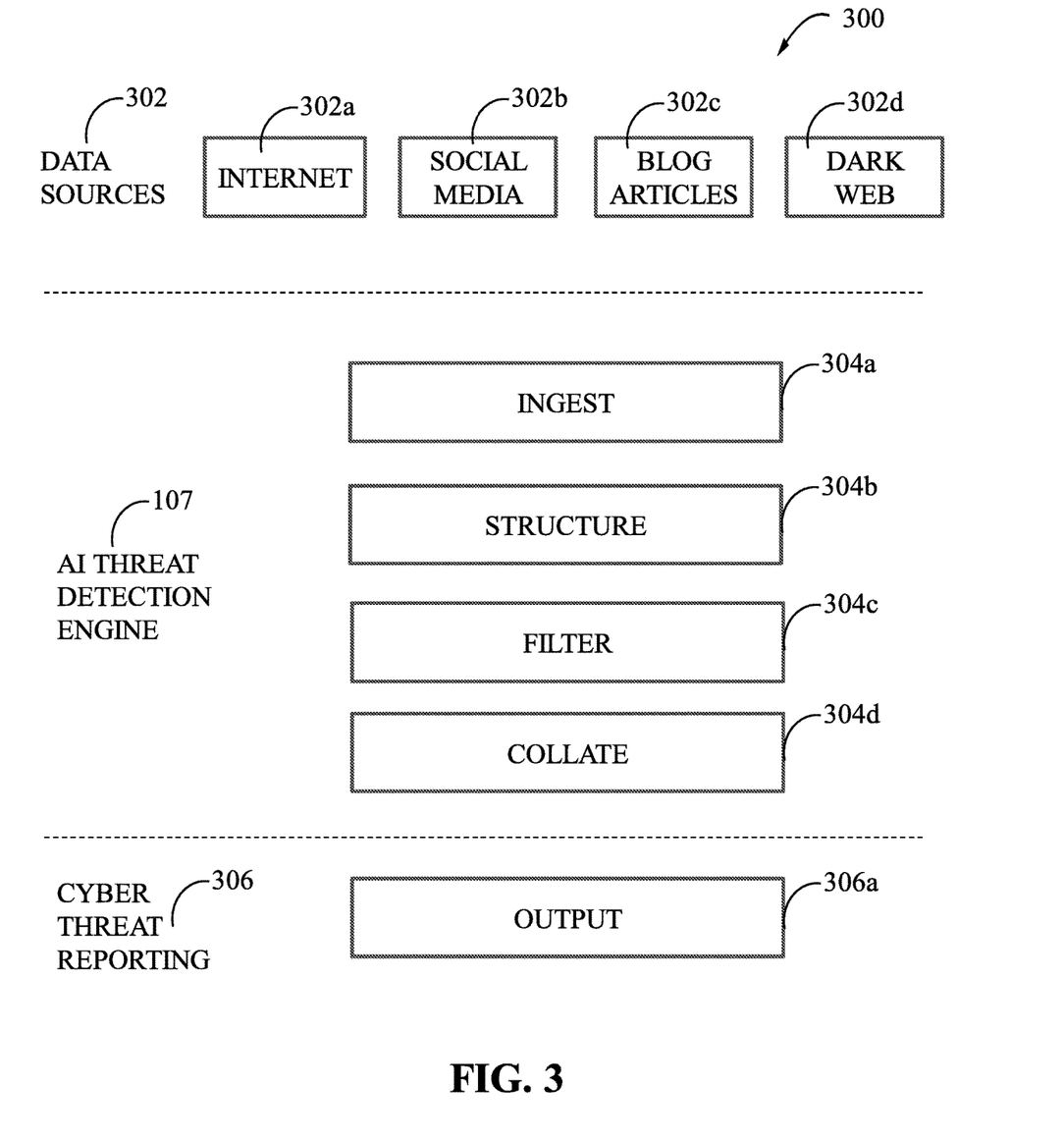
FIG. 3 is a diagram that illustrates operations of an Artificial Intelligence (AI) threat detection engine, according to an exemplary embodiment of the present invention.

FIG. 3 is a diagram 300 that illustrates operations of the AI threat detection engine 107, according to an exemplary embodiment of the present invention. In an embodiment, the AI threat detection engine 107 may be configured to crawl various data sources 302 such as the internet 302a (i.e., public or private internet), social media platforms 302b, blog articles 302c, and dark web 302d. The dark web is a secluded part of the internet where black hat (unethical hackers) trade software/hardware vulnerabilities in exchange for untraceable cryptocurrency. The dark web can only be accessed through a special internet browser in order to view content in chatrooms/websites used by black hat hackers. By working in conjunction with Krzana™, a world leading Artificial Intelligence software development firm specializing in software that is able to read social media content or website posts, the Uncloak platform 103 may be able to provide the most up to date cyber threats database for the client 101 relevant to their computing infrastructure 102. Thus, the AI threat detection engine 107 may crawl the data sources 302 to search for the latest cyber security threats. These threats are collected as raw unformatted data. The AI threat detection engine 107 transforms the raw unformatted data to relevant cyber threat data. The Uncloak platform 103 may feature a private cloud based real-time cyber threat search engine powered by artificial intelligence, taking vast amounts of unstructured text data and turning it into structured and legible actionable data used for reporting to clients about the current cyber threat landscape. The AI threat detection engine 107 may be configured to read streams of published text data from over 7,000 independent/forums/chatrooms/metadata/blogs per minute across the public internet and the dark web and tag it appropriately to build up a unique threat landscape report. In an exemplary embodiment, the AI threat detection engine 107, at step 304a, may ingest i.e., translate and normalize data such as the unstructured text data. Further, the AI threat detection engine 107, at step 304b, may structure i.e., organize the data into categories. Further, the AI threat detection engine 107, at step 304c, may filter i.e., remove irrelevant data. For example, the irrelevant data may be removed from each category of the organized data to determine cyber security threats. Further, the AI threat detection engine 107, at step 304d, may collate i.e., organize similar data and prioritize. For example, the similar cyber security threats may be collated. The collated cyber security threats may be stored in the threat detection database 104. Further, the AI threat detection engine 107 perform cyber threat reporting 306. This includes outputting organized relevant data for review.

Figure 4:
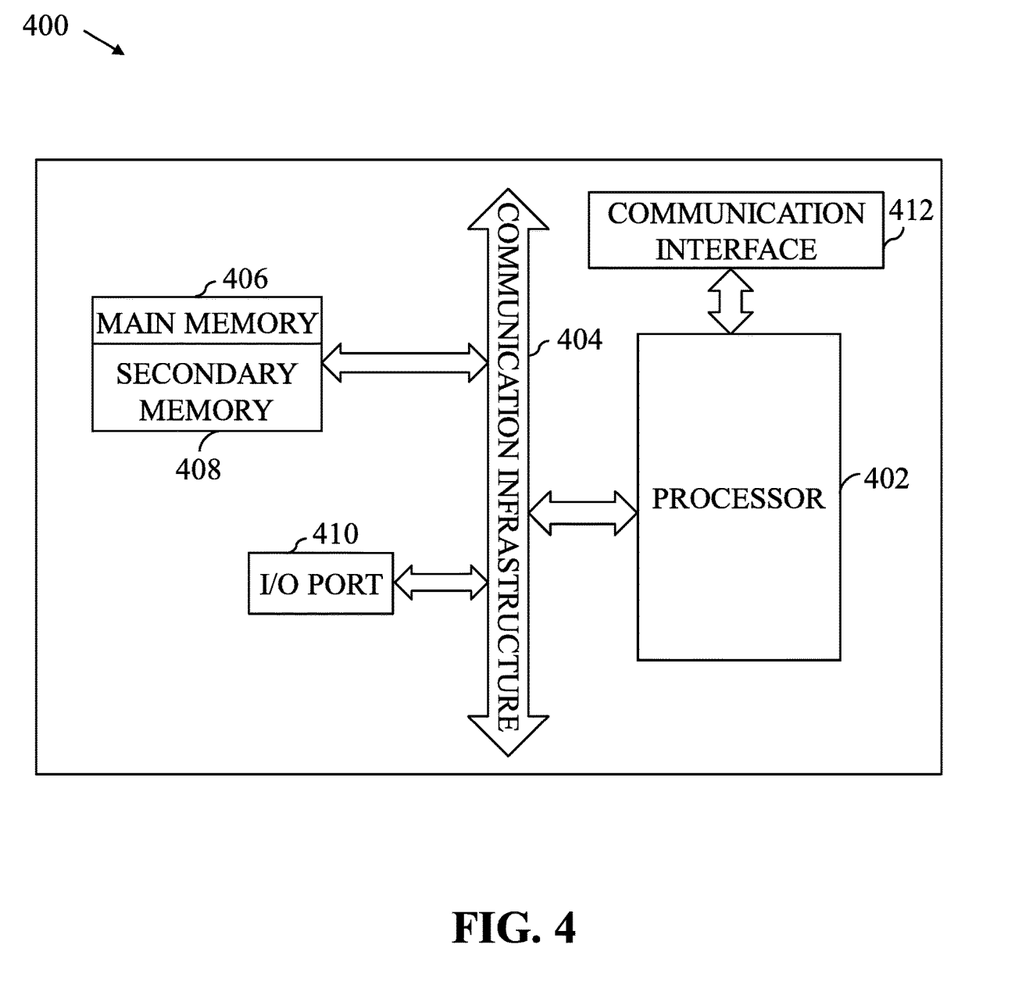
FIG. 4 is a diagram that illustrates a system architecture of a computer system for managing cyber security threats in an online manner, according to an exemplary embodiment of the present invention.

FIG. 4 is a diagram that illustrates a system architecture of a computer system 400 for managing cyber security threats in an online manner, according to an exemplary embodiment of the present invention. An embodiment of the disclosure, or portions thereof, may be implemented as computer readable code on the computer system 400. In one example, various components (such as the Uncloak platform 103 or the database 104 or the AI threat detection engine 107) of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2 and 3.

The computer system 400 may include a processor 402 that may be a special purpose or a general-purpose processing device. The processor 402 may be a single processor, multiple processors, or combinations thereof. The processor 402 may have one or more processor "cores." Further, the processor 402 may be coupled to a communication infrastructure 404, such as a bus, a bridge, a message queue, the communication network, multi-core message-passing scheme, and the like. The computer system 400 may further include a main memory 406 and a secondary memory 408. Examples of the main memory 406 may include RAM, ROM, and the like. The secondary memory 408 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 400 may further include an I/O port 410 and a communication interface 412. The I/O port 410 may include various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communications port, and the like. Data transferred via the communication interface 412 may be signals, such as electronic, electromagnetic, optical, or other signals as will be apparent to a person of ordinary skill in the art. The signals may travel via a communications channel, such as the communication network, which may be configured to transmit the signals to the various devices that are communicatively coupled to the computer system 400. Examples of the communication channel may include a wired, wireless, and/or optical medium such as cable, fiber optics, a phone line, a cellular phone link, a radio frequency link, and the like. The main memory 406 and the secondary memory 408 may refer to non-transitory computer readable mediums that may provide data that enables the computer system 400 to implement the methods illustrated in FIGS. 2 and 3.

Various embodiments of the disclosure provide a non-transitory computer readable medium having stored thereon, computer executable instructions, which when executed by a computer, cause the computer to execute operations for managing cyber security threats. Further, various embodiments of the disclosure provide a non-transitory computer readable medium having stored thereon, computer executable instructions, which when executed by a computer, cause the computer to execute operations for creating a decentralized, scalable, blockchain powered cyber security management solution to monitor, protect themselves against and eliminate cyber threats, thereby managing cyber security. Further, various embodiments of the disclosure provide a non-transitory computer readable medium having stored thereon, computer executable instructions, which when executed by a computer, cause the computer to execute operations for building a threat detection database by using advanced AI technology. Further, various embodiments of the disclosure provide a non-transitory computer readable medium having stored thereon, computer executable instructions, which when executed by a computer, cause the computer to execute operations for facilitating automatically identifying a client's public internet footprint covering websites, email servers, applications, and computers on the internet in readiness for a security scan greatly reducing the timescales around security scanning setup. The Uncloak threat detection system further facilitates easy to understand dashboard to check progress of scans and reports, request external IT consultancy, and set up schedule scanning jobs. The Uncloak threat detection system further facilitates executing a black hat test. The black hat test would simulate what an actual hacker would do to gain access to a corporate computer system. For example, the Uncloak threat detection system may simulate a live hack attempt against an email server and check the client's antivirus protection.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for managing cyber security threats. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the following claims.

What is claimed is:

1. A cyber security threat management system for creating a decentralized, scalable, blockchain powered cyber security management solution to monitor, protect themselves against, and eliminate cyber threats, the system comprising:

an Uncloak platform, a threat detection engine, a threat detection database, a computing infrastructure associated with a customer, and a community of hunters that are communicatively connected with each other for communication via private or public Internet, wherein:

the threat detection engine is configured to use Artificial Intelligence (AI) technology to crawl data sources including at least a public internet, a private internet, a dark web, and a social media platform to search for latest cyber security threat data that are formatted, converted into security signatures, and stored in the threat detection database;

the Uncloak platform is configured to automatically scan the computing infrastructure covering websites, email servers, applications, and computers of the customer via the Internet to search for one or more vulnerabilities that are reported to the customer;

the Uncloak platform is further configured to perform a check to determine whether the one or more vulnerabilities already exist as one or more cyber security threats in the threat detection database;

the Uncloak platform is further configured to create and assign a task to a first set of hunters from the community of hunters to check for the one or more vulnerabilities when the one or more vulnerabilities do not exist in the threat detection database, wherein the one or more vulnerabilities found by the first set of hunters are validated by a second set of hunters from the same community of hunters to determine if the one or more found vulnerabilities are valid or invalid; and the Uncloak platform is further configured to add the one or more found vulnerabilities as one or more new cyber vulnerabilities in the threat detection database, when the one or more found vulnerabilities are determined as valid, wherein the new cyber vulnerabilities along with possible remedies are communicated to the customer in real time for eliminating the new cyber vulnerabilities in a timely manner, which in turn reduces level of manual administration, costs, and timescales around security scanning setup.

2. The system of claim 1, wherein the threat detection engine is further configured to translate and normalize unstructured raw data including the cyber security threat data, organize the normalized data into categories, remove irrelevant data from each category of the organized data to determine cyber security threats, and collate the similar cyber security threats and store the collated cyber security threats in the threat detection database.

3. The system of claim 1, wherein the threat detection engine is an Artificial Intelligence (AI) based threat detection engine that is communicatively connected to at least the public internet, the private internet, the dark web, and the social media platform.

4. The system of claim 1, wherein the threat detection engine is further configured to to crawl the public and private internet and dark web searching for the latest cyber security threats, which are added to the threat detection database to check if vulnerabilities exist across the subscribed client base networks and infrastructure.

5. The system of claim 1, wherein the Uncloak platform is further configured to manage cyber security threat or vulnerabilities based on a blockchain and/or AI powered technologies.

6. The system of claim 1, wherein the Uncloak platform is further configured to facilitate a user dashboard to check progress of scans and reports, request external IT consultancy, and set up schedule scanning jobs, wherein the user dashboard is further utilized by users to scan their internal network for threats and vulnerabilities and report back to the Uncloak platform.

7. The system of claim 1, wherein the Uncloak platform is further configured to reward a first quantity of tokens to the first set of hunters for finding the one or more vulnerabilities and a second quantity of tokens to the second set of hunters for successfully validating the one or more vulnerabilities, wherein the first set of hunters are different from the second set of hunters, and wherein the second set of hunters includes at least two hunters.

8. The system of claim 7, wherein the first quantity of tokens is greater than the second quantity of tokens, and wherein transactions related to rewarding of tokens are recorded in a blockchain.

9. The system of claim 1, where each hunter of the community of hunters is an ethical hacker or a non-ethical hacker, who is a security expert or a software developer and who is registered on the Uncloak platform.

10. The system of claim 1, wherein one or more hunters of the community of hunters are allowed to perform cyber security threat hunting onto the Uncloak platform after successful registration, wherein the successful registration is performed by the Uncloak platform by successfully executing and validating at least an application of each hunter.

11. The system of claim 8, wherein the Uncloak platform is further configured to convert the rewarded tokens to tradable tokens that can exchanged for other digital currency.

12. The system of claim 1, wherein the Uncloak platform is realized and implemented using blockchain and Artificial Intelligence (AI) based technologies.

* * * * *